(12) United States Patent
Wermund et al.

(10) Patent No.: US 11,787,450 B2
(45) Date of Patent: Oct. 17, 2023

(54) LEVEL CONTROL SYSTEM FOR ADJUSTING THE LEVEL OF A VEHICLE, IN PARTICULAR A RAIL VEHICLE

(71) Applicant: KNORR-BREMSE SYSTEME FÜR SCHIENENFAHRZEUGE GMBH, Munich (DE)

(72) Inventors: Ulrich Wermund, Munich (DE); Mark A. Sterrett, Hanover, PA (US); Jurgen Muhr, Munich (DE); Eduard Nies, Puchheim (DE)

(73) Assignee: KNORR-BREMSE SYSTEME FÜR SCHIENENFAHRZEUGE GMBH

( * ) Notice: Subject to any disclaimer, the term of this patent is extended or adjusted under 35 U.S.C. 154(b) by 288 days.

(21) Appl. No.: 16/762,095

(22) PCT Filed: Sep. 17, 2018

(86) PCT No.: PCT/EP2018/075008
§ 371 (c)(1),
(2) Date: May 6, 2020

(87) PCT Pub. No.: WO2019/091635
PCT Pub. Date: May 16, 2019

(65) Prior Publication Data
US 2020/0353958 A1    Nov. 12, 2020

(30) Foreign Application Priority Data

Nov. 9, 2017 (EP) .................... 17200882
Jul. 31, 2018 (DE) .................... 10 2018 118 466.2

(51) Int. Cl.
*B61F 5/22* (2006.01)

(52) U.S. Cl.
CPC ............ *B61F 5/22* (2013.01); *B60G 2300/10* (2013.01); *B60G 2500/30* (2013.01)

(58) Field of Classification Search
CPC ... B61F 5/22; B60G 2300/10; B60G 2500/30; B60G 17/0272; F15B 15/24
See application file for complete search history.

(56) References Cited

U.S. PATENT DOCUMENTS 3,003,597 A * 10/1961 Bourcier ................ F16F 9/512
188/317
5,471,827 A * 12/1995 Janssen .................. A01G 18/70
56/13.1

(Continued)

FOREIGN PATENT DOCUMENTS

AT     19372001 A    5/2003
CZ        16146 U1   1/2006

(Continued)

OTHER PUBLICATIONS

International Search Report corresponding to PCT/EP2018/075008, dated Dec. 20, 2018.

*Primary Examiner* — Drew J Brown
(74) *Attorney, Agent, or Firm* — Barnes & Thornburg LLP

(57) ABSTRACT

A level control system adjusts the level of a vehicle, in particular a rail vehicle, and includes at least one level control cylinder and a level control piston. The level control piston is at least partly received in the level control cylinder in a movable manner. The level control cylinder has a collar-shaped shoulder, and the level control system has a first fixing disc which is connected to the level control piston in order to transmit a lifting movement. At least one spacer element is arranged between the collar-shaped shoulder of the level control cylinder and the first fixing disc.

7 Claims, 3 Drawing Sheets

(56) References Cited

U.S. PATENT DOCUMENTS

| | | | | |
|---|---|---|---|---|
| 5,984,286 A | * | 11/1999 | Busch | B60G 17/0272 |
| | | | | 267/218 |
| 6,106,424 A | * | 8/2000 | Kratz | F16H 7/0836 |
| | | | | 474/138 |
| 9,315,203 B2 | | 4/2016 | Franks et al. | |
| 2003/0107161 A1 | * | 6/2003 | Teichmann | F16F 1/12 |
| | | | | 267/64.11 |
| 2004/0016361 A1 | * | 1/2004 | Teichmann | B61F 5/148 |
| | | | | 105/164 |
| 2005/0029064 A1 | * | 2/2005 | Gaile | B60G 17/01933 |
| | | | | 188/322.21 |
| 2012/0180693 A1 | * | 7/2012 | Haas | B61F 5/22 |
| | | | | 105/206.1 |
| 2013/0161138 A1 | * | 6/2013 | Barefoot | F16F 9/34 |
| | | | | 188/282.1 |
| 2014/0346258 A1 | * | 11/2014 | Stucchi | F02M 61/04 |
| | | | | 137/627.5 |
| 2015/0021445 A1 | * | 1/2015 | Franks | B61B 1/02 |
| | | | | 105/199.1 |
| 2016/0121686 A1 | * | 5/2016 | Botello | B60G 17/021 |
| | | | | 280/6.157 |
| 2016/0144931 A1 | * | 5/2016 | Duff | B63B 19/197 |
| | | | | 16/83 |
| 2016/0176417 A1 | * | 6/2016 | Gaile | B61F 5/10 |
| | | | | 105/199.3 |

FOREIGN PATENT DOCUMENTS

| | | | | |
|---|---|---|---|---|
| DE | 29606024 U1 | | 6/1996 | |
| JP | 2010076608 A | * | 4/2010 | |
| WO | WO-2008017459 A1 | * | 2/2008 | B60G 11/27 |

* cited by examiner

LEVEL CONTROL SYSTEM FOR ADJUSTING THE LEVEL OF A VEHICLE, IN PARTICULAR A RAIL VEHICLE

CROSS REFERENCE AND PRIORITY CLAIM

This patent application is a U.S. National Phase of International Patent Application No. PCT/EP2018/075008 filed Sep. 17, 2018, which claims priority to German Patent Application No. 10 2018 118 466.2 and claims priority to European Patent Application No. 17200882.3, the disclosure of which being incorporated herein by reference in their entireties.

FIELD

Disclosed embodiments relate to a level control system for adjusting the level of a vehicle, in particular a rail vehicle, having at least one level control cylinder and one level control piston, wherein the level control piston is at least partially movably received in the level control cylinder.

BACKGROUND

The prior art has disclosed level control systems for rail vehicles, using which the height between the bogie and the vehicle superstructure can be adjusted for the purposes of regulating the height of the superstructure of the rail vehicle.

SUMMARY

Disclosed embodiments provide a level control system of the type mentioned at the outset in an advantageous manner, in particular such that a space-saving level control system is provided which enables a level of a vehicle to be adjusted in a reliable manner and permits efficient and cost-effective installation and maintenance.

BRIEF DESCRIPTION OF THE FIGURES

Further details and advantages of the disclosed embodiments will now be discussed with reference to exemplary embodiments illustrated in more detail in the drawings. In the drawings.

DETAILED DESCRIPTION

Figure 1:
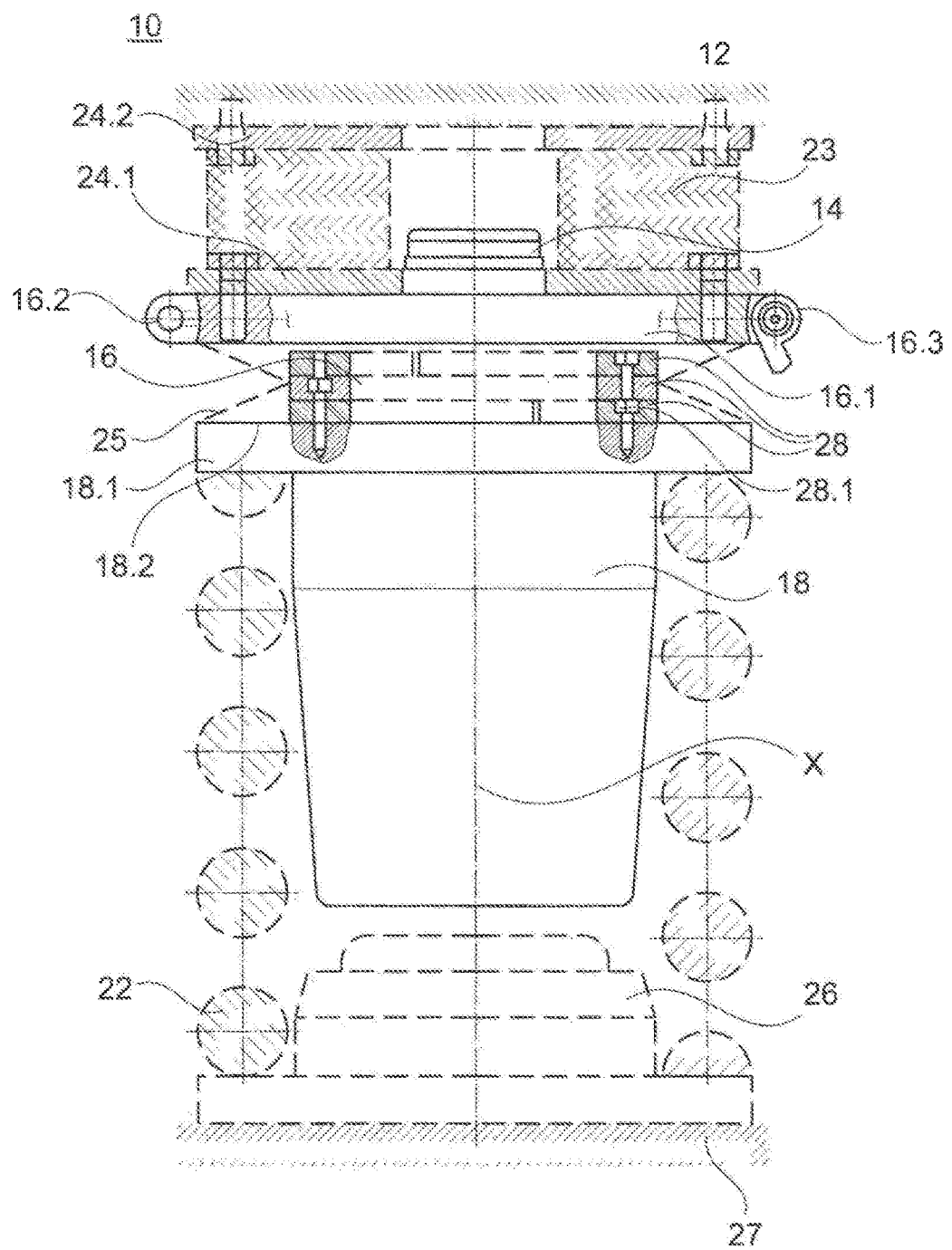
FIG. 1 shows a schematic front view of an exemplary embodiment of a level control system with a level control cylinder and with a level control piston in the partially retracted state.

DE 103 15 000 A1 has disclosed a device for secondary suspension. For the secondary suspension, a spring element is provided between the bogie and the car body, which spring element may be an active hydraulic spring, gas spring or the like or else a passive spring in the form of a steel spring or the like designed in the manner of a compression spring. A pulling cylinder is provided between the bogie and the car body for the spring element, with which pulling cylinder a restoring force acting counter to the force of the spring element can be generated in order to bring the car body from the raised travel level to a lowered platform level (loading/unloading position) and hold the car body there. A deactivation of the pulling cylinder has the effect that the car body moves back to the raised travel level by the restoring force of the spring stage. The pulling cylinder is in this case a hydraulic cylinder which can be pressurized in a single-acting manner. In order to effect the pulling action, that is to say in order that the piston rod plunges into the cylinder body of the pulling cylinder in the event of charging with pressure medium, the internal piston is charged with pressure medium at a cylinder cover side.

U.S. Pat. No. 9,315,203 B2 has likewise disclosed a level control system for a rail vehicle, which level control system can raise the car body of the rail vehicle using hydraulic cylinders. Here, the hydraulic cylinders are connected to the bogie of the rail vehicle.

Disclosed embodiments further develop a level control system of the type mentioned at the outset in an advantageous manner, in particular such that a space-saving level control system is provided which enables a level of a vehicle to be adjusted in a reliable manner and permits efficient and cost-effective installation and maintenance.

Disclosed embodiments provide a level control system for adjusting the level of a vehicle, in particular a rail vehicle, having at least one level control cylinder and one level control piston is provided, wherein the level control piston is at least partially movably received in the level control cylinder. The level control cylinder has a collar-like shoulder, wherein the level control system has a first fixing disk which is connected to the level control piston for the purposes of transmitting a lifting movement, wherein at least one spacer element is arranged between the collar-like shoulder of the level control cylinder and the first fixing disk.

If the level control piston, owing to its construction, is formed or designed without a collar-like shoulder and instead the first fixing disk is provided, the at least one spacer element may consequently be arranged between the collar-like shoulder of the level control cylinder and the first fixing disk.

Additionally or alternatively, provision may be made whereby the at least one spacer element is arranged directly between the collar-like shoulder of the level control cylinder and a car body of a vehicle, in particular a rail vehicle. In this case, the spacer element is either situated in an intermediate space that connects the collar-like shoulder of the level control cylinder and the car body directly to one another. Alternatively, the spacer element may also be arranged on further components, such as the first fixing disk, which in the installed state are provided between the collar-like shoulder of the level control piston and the car body.

The disclosed embodiments are based on the basic idea that the installation of a level control system can be both simplified and optimized in terms of functionality using an integral construction, for example, of the level control piston.

Furthermore, a decisive, significant reduction of the structural space height of the level control system, in particular in the region of the level control piston and of the level control cylinder, can be achieved. Accordingly, the structural space height can, using an integral construction of the components, be reduced to approximately half of the originally required structural space of a lifting cylinder.

In particular, a space-saving construction and simplified production of the level control system can be achieved. Functional characteristics of the level control system are optionally contained or integrated directly in the geometrical construction of the level control piston and/or of the level control cylinder.

Furthermore, simplified handling of the level control system can be provided not only during operation, for example in the form of the hydraulic connectors integrated in the level control cylinder. Rather, the maintenance and servicing of the level control system can also be optimized by virtue of the level control system being constructed with a smaller number of components and so as to be easily accessible.

Consequently, the technical utility of a level control system according to the disclosed embodiments is noticeable not only during the running time of the level control system, but also in the course of the production, installation and maintenance of the system, in particular with regard to simplified handling of the system.

According to the disclosed embodiments, the level control piston is provided so as to be at least partially movable in the level control cylinder for the purposes of adjusting the level of the rail vehicle.

The level control piston is, correspondingly to a conventional lifting cylinder, arranged movably within the level control cylinder.

The level control cylinder is optionally designed as a hydraulically actuatable level control cylinder.

In a retracted state of the level control system, the level control piston is optionally arranged or received entirely within the level control cylinder.

Alternatively, the level control piston is, in the retracted state, arranged at least partially or mostly within the level control cylinder.

In an extended state of the level control system, the level control piston is arranged partially or mostly outside the level control cylinder. A stroke is thus provided between the retracted and the extended state of the level control system.

Provision is furthermore made whereby the level control cylinder has a collar-like, or collared, shoulder, wherein the level control system has a first fixing disk which is connected to the level control piston for the purposes of transmitting a lifting movement, wherein at least one spacer element is arranged between the collar-like shoulder of the level control cylinder and the first fixing disk.

Using the collar-like shoulder of the level control cylinder, a working region or a working space is available between those components of the level control system which are movable relative to one another, in particular the collar-like shoulder of the level control cylinder and the first fixing disk in connection with the level control piston.

The working region is formed in particular by the opposing surfaces of the collar-like shoulders of the level control cylinder and of the level control piston. Here, the height of the working region is dependent on the present stroke, which is set by a relative position of the level control piston in relation to the level control cylinder.

In the context of the disclosed embodiments, provision is made to arrange at least one spacer element in the working region between the collar-like shoulder of the level control cylinder and the first fixing disk.

In this way, a minimum stroke between the level control cylinder and the level control piston can be set.

A minimum spacing between a car body and a vehicle bogie of a rail vehicle can be predetermined.

The at least one spacer element may optionally be fastened along the collar-like shoulder of the level control cylinder.

The setting of such a minimum spacing is possible without dismounting the level control device, by virtue of the fact that further spacer elements can be slid in or inserted in the assembled state of the level control system.

Spacer elements lying on top of one another are optionally fastenable to one another.

Optionally, multiple spacer elements, may be, in particular, arranged on top of one another, may be identical. Alternatively, it is possible for multiple spacer elements to have, in particular, different heights.

In particular, in the event of a fault or in the event of failure of the level control system, a minimum spacing between the vehicle superstructure and running gear can be ensured by virtue of the fact that a minimum spacing can be preset using at least one spacer disk.

Furthermore, a minimum spacing to be ensured can be adjusted or adapted if, for example, wheel elements of the vehicle are to be reworked and, in the course of this, the original height of the vehicle superstructure is reduced.

Using the at least one spacer element, it is advantageously possible for a minimum spacing between the level control cylinder and the level control piston to be set as required and to be reliably predetermined in the event of a fault of the level control system.

In one embodiment, the level control piston has a collar-like shoulder in contact with the first fixing disk, such that the at least one spacer element is arranged between the collar-like shoulders of the level control piston and of the level control cylinder.

If the level control piston has a collar-like shoulder, the arrangement of the first fixing disk on a collar-like shoulder can be omitted.

In this case, both the level control cylinder and the level control piston are configured with a collar-like shoulder.

In this context, the at least one spacer element is arranged between the collar-like shoulder of the level control cylinder and the first fixing disk, in particular between the collar-like shoulders of the level control cylinder and of the level control piston.

In this context, a minimum stroke travel of the level control system is limited if the at least one spacer element is supported on the collar-like shoulders of the level control cylinder and of the level control piston.

A minimum stroke travel or a minimum spacing between the level control cylinder and the level control piston or the first fixing disk can advantageously be ensured.

The level control cylinder and the level control piston are advantageously supported directly against one another via the at least one spacer element.

Furthermore, according to the relationship described above, provision may furthermore be made whereby the at least one spacer element is fastenable to the collar-like shoulder of the level control piston or of the level control cylinder, to the first fixing disk to or the car body. This ensures a high degree of variability in use, and use adapted to the application, of the spacer element.

According to a further embodiment, the at least one spacer element is fastenable using at least one magnetic fastening element or is formed from a magnetic material. The magnetic connection of the spacer element or of the spacer elements permits, in particular, easy installation and uninstallation of the spacer element on the corresponding counterparts as described above. The magnetic fastening element may be attached to the spacer element itself and/or attached to the counterpart that is correspondingly coupled and to be fastened.

According to a yet further embodiment, the at least one spacer element is in the form of a half-segment disk.

Here, a half-segment disk is to be understood to mean a disk or spacer disk which has the basic shape of a circular segment.

It is basically conceivable that partial-segment-like spacer elements may also be selected.

Accordingly, the at least one spacer element in the form of a half-segment disk can be inserted between the level control piston and the level control cylinder in the assembled and operationally ready state of the level control system.

In particular, the half-segment-disk-shaped spacer element can be positioned and fastened along the collar-like shoulder of the level control cylinder in the operating state of the level control system. Here, owing to the half-segment-like configuration of the spacer element, it can be placed or positioned directly on the cylinder, for example, specifically without being threaded onto the cylinder.

A minimum stroke or a minimum spacing between the level control cylinder and the level control piston can be readjustable in an operationally ready state of the level control system using the spacer elements of half-segment disk form.

According to a further embodiment, at least two spacer elements are arranged in a symmetrically distributed manner between the collar-like shoulder of the level control cylinder and the first fixing disk.

According to yet another embodiment, it can be provided in this context that at least two spacer elements are arranged symmetrically directly between the collar-like shoulder of the level control cylinder and the car body of the vehicle, in particular rail vehicle.

Using the symmetrical arrangement of the at least two spacer elements, a uniform force distribution along the collar-like shoulder of the level control cylinder, and possibly of the level control piston, can be provided. It is thus possible, for example in the event of a fault of the level control system, for a contact pressure along the collar-like shoulders to be reduced.

In this context, provision may in particular be made whereby more than two spacer elements are arranged in a symmetrically distributed manner along the collar-like shoulder of the level control cylinder.

Furthermore, the at least two spacer elements may be provided with any desired expedient plurality of spacer elements stacked on top of one another.

Spacer elements which lie on the collar-like shoulder of the level control cylinder can optionally be screwed, clamped, fixed using magnets or the like to the level control cylinder or to the collar-like shoulder of the level control cylinder.

Spacer elements stacked on top of one another can optionally be screwed, clamped or the like to one another.

According to a further embodiment, provision is made whereby the level control system has at least one bellows which is arranged between the collar-like shoulder of the level control cylinder and the first fixing disk and/or the collar-like shoulder of the level control piston.

Additionally or alternatively, provision may be made in this context whereby, according to a further embodiment, the bellows is arranged between the collar-like shoulders of the level control cylinder and of the level control piston.

Furthermore, it is conceivable in this regard for the bellows to be designed as a retractable and extendable corrugated bellows, which is formed from an elastomer.

In particular, the bellows is provided between the collar-like shoulders such that the spacer elements and the level control cylinder and the level control piston are protected against contamination or the like.

The bellows may furthermore also be accordingly provided or arranged, independently of the spacer elements, between the collar-like shoulders.

The bellows may optionally be arranged and fastenable along the collar-like shoulder of the level control cylinder and/or of the level control piston or along the first fixing disk. The bellows can thus be driven along and also securely positioned in the course of a lifting movement of the level control system.

According to a further embodiment, the collar-like shoulder of the level control cylinder and/or the collar-like shoulder of the level control piston has a receiving groove for receiving the bellows.

According to yet another embodiment, the first fixing disk may also have a receiving groove for receiving the bellows.

In particular, the receiving groove may be configured as an encircling receiving groove along the respective collar-like shoulder. The bellows may be configured with a bead or the like in order to ensure secure engagement into the receiving groove of the level control cylinder.

The bellows can thus be securely received and positioned along the level control cylinder, even in the course of a relative movement between the level control cylinder and the first fixing disk or the level control piston.

In a further embodiment, provision is made whereby the bellows has a stiffening element such that the bellows is detachably and rotatably fixed in the receiving groove of the level control cylinder.

Furthermore, in this context, provision may be made whereby the bellows is detachably and rotatably fixed in the receiving groove of the level control cylinder and of the level control piston.

In particular, along a circumference of the bellows, a stiffening element may be provided in an integrated manner such that the bellows can be securely fixed in the receiving groove of the level control cylinder and of the level control piston.

In this context, the stiffening element is optionally inserted in the bellows or bellows material. In particular, the stiffening element is arranged in the bellows so as not to be visible from the outside.

The stiffening element may be configured as a single-piece ring. Alternatively, the stiffening element may be composed of a multiplicity of individual elements.

The stiffening element is configured such that it is possible to achieve expedient dimensional stability of the bellows for engagement into the receiving groove of the level control cylinder and of the level control piston.

Expedient local stiffening of the bellows can be provided using the molded element. In this way, the bellows can securely engage into the receiving groove of the level control cylinder and of the level control piston.

In this way, using the stiffening element, an integrated stiffening function for stabilizing the bellows and an integrally configured securing function are provided.

The stiffening element may in particular be a vulcanized metal ring or a similar expediently usable material in the context of a vehicle, in particular of a rail vehicle.

According to one embodiment, the level control system has a single, in particular centrally arranged, fastening element for the purposes of connecting the level control piston to the level control cylinder.

The level control system can optionally be assembled in an expedient manner using a single fastening element, in particular the level control piston and the level control cylinder.

Accordingly, the level control system can be assembled and disassembled easily and quickly. A reduction of individual components for configuring the level control system can be achieved.

In particular, the fastening element may be configured as a screw, a bolt, a hook, a magnet, a cable, an adhesive or the like.

The single fastening element is optionally arranged centrally, in particular along a longitudinal axis of the level control cylinder or of the level control piston.

In the context of the disclosed embodiments, the longitudinal axis may be understood as a common longitudinal axis of the level control cylinder and of the level control piston, wherein a lifting movement of the level control piston takes place along the longitudinal axis.

Using a single fastening element, a low level of installation effort or maintenance effort is required for the level control system.

Furthermore, a uniform connecting force or contact pressure can be achieved in the course of the expedient connection of the level control piston to the level control cylinder for the purposes of providing a suitable lifting cylinder.

An expedient connection between the level control cylinder and the level control piston can be provided using the fastening element, wherein it is ensured that the level control piston is received in a movable manner.

Movable receiving of the level control piston in the level control cylinder is optionally predeterminable within the scope of a predeterminable stroke travel of the level control system.

According to a further embodiment, the level control cylinder and the level control piston each have a central bore for receiving the fastening element, wherein the central bore of the level control piston is configured as a passage bore.

By virtue of both the level control piston and the level control cylinder being configured with a central bore for the fastening element, a central arrangement of the fastening element is available.

The central arrangement of the fastening element ensures a uniform force distribution for the connection of the level control cylinder to the level control piston.

Furthermore, using the central arrangement of the fastening element, a connection of the level control cylinder to the level control piston can expediently be realized using a single fastening element.

A reduction in the number of individual parts of the level control system can be provided in order to achieve simplified assembly and simplified maintenance.

According to one embodiment, provision is made whereby the central bore of the level control piston has a varying diameter.

In particular, the diameter of the central bore of the level control piston may decrease or increase along a portion of the longitudinal extent.

The diameter of the central bore of the level control piston optionally decreases in such a way that a fastening element can at least partially project through the reduced diameter.

Furthermore, provision is made whereby the fastening element can at least partially project through the reduced diameter and out of the level control piston.

A connection to the central bore of the level control cylinder can thus be provided.

According to a further embodiment, the varying diameter is provided along the central bore of the level control piston for the purposes of interaction with the fastening element, such that a relative movement between the level control piston and the level control cylinder can be limited.

In particular, the projection provides a portion-wise reduction of the diameter of the central bore of the level control piston.

Provision is optionally made whereby the projection, as a reduced diameter, enters into engagement with a head or the like of the fastening element. A stop for the level control piston is thus available.

A maximum stroke of the level control piston is attained as soon as the head of the fastening element, such as a screw, a rivet or the like, comes into contact with the projection along the central bore of the level control piston.

In this way, a stop for a maximum, limited stroke movement or relative movement between the level control piston and the level control cylinder can be provided using an integral construction of the level control piston.

According to a further embodiment, a closure element for sealing an inner diameter of the level control cylinder is arranged in the central bore of the level control piston.

Using the closure element, an escape of hydraulic fluid from an inner diameter of the level control cylinder, for the provision of a stroke for the level control system, can be prevented.

In particular, the closure element may itself provide a sealing action or have an additional sealing element such as an O-ring in conjunction with a corresponding groove or the like.

According to one embodiment, the closure element has a passage bore for connecting at least one first hydraulic connector of the level control piston to the inner diameter of the level control cylinder.

The first hydraulic connector may be connected to the central bore of the level control piston using an associated first fluid channel in such a way that a hydraulic fluid or pressure fluid can be fed or discharged for the purposes of providing a stroke of the level control system.

In the context of a construction that is as compact as possible, provision is made whereby the closure element can provide an elongation of the at least one fluid channel using a passage bore.

The closure element can thus project beyond the first fluid channel into the central bore of the level control piston.

A reliable closure of the central bore and of the inner diameter of the level control cylinder, filled with hydraulic fluid, can be provided.

Furthermore, in the context of the disclosed embodiments, at least one further, second hydraulic connector may be provided in connection with a second fluid channel According to a further embodiment, at least one first boss for receiving the first hydraulic connector is provided along the collar-like shoulder of the level control piston or of the level control cylinder, wherein the first boss is, in relation to a longitudinal axis of the level control cylinder or of the level control piston, arranged tangentially on the collar-like shoulder such that at least one external fluid connection is connectable tangentially on the collar-like shoulder to the at least one first hydraulic connector.

Along the collar-like shoulder, there is provided at least one first boss, on which or in which the first hydraulic connector is integrally formed or received.

With respect to the longitudinal axis of the level control cylinder, the first hydraulic connector can be received, and in particular positioned or arranged so as to run tangentially along the outer diameter of the collar-like shoulder of the level control piston or of the level control cylinder, using the boss.

By virtue of the first hydraulic connector being arranged and formed tangentially on the collar-like shoulder of the level control cylinder or of the level control piston using the first boss, an external fluid connection can be connectable tangentially on the collar-like shoulder to the at least one first hydraulic connector.

It is thus possible for an integral and space-saving arrangement of the at least one first hydraulic connector to be provided.

In the case of an arrangement along the collar-like shoulder of the level control cylinder, it is possible in particular for a breakaway of the external fluid connection from the first hydraulic connector to be prevented, in particular in comparison with an arrangement of the hydraulic connector on the level control piston.

Furthermore, in the context of the disclosed embodiments, it is optionally possible for at least one second boss to be provided for the integral formation or receiving of a second hydraulic connector on the collar-like shoulder of the level control piston or of the level control cylinder.

Furthermore, the at least one first boss may be formed as a cutout on the collar-like shoulder, such that the first hydraulic connector can be or is arranged on the first boss.

The boss may be formed as a cutout or a milled-out portion for receiving the first hydraulic connector.

The first hydraulic connector is optionally integrally formed in an expedient manner on the first boss.

Furthermore, provision may be made whereby the at least one first boss is formed as an elevation which projects beyond the outer diameter of the collar-like shoulder, such that the first hydraulic connector can be or is arranged on an outer side of the collar-like shoulder tangentially with respect to the outer diameter of the collar-like shoulder.

In particular, the first hydraulic connector may be received in the protuberance of the first boss, such that the first hydraulic connector is positioned and supported.

In the context of the disclosed embodiments, using the first hydraulic connector and the first boss, it is possible for a tangentially oriented connection of an external fluid connection to be realized along the circular basic geometry of the collar-like shoulder.

Furthermore, in the context of the disclosed embodiments, a second boss and a second hydraulic connector may be provided in an identical manner to the first boss and first hydraulic connector.

Optionally, the first and second hydraulic connector or boss are arranged in a symmetrically distributed manner along the collar-like shoulder.

Optionally, the at least one first hydraulic connector is connected in non-positively and/or positively locking fashion to the at least one first boss of the collar-like shoulder.

In particular, the first hydraulic connector may be welded, adhesively bonded, screwed or clamped to or on the first boss of the collar-like shoulder, pressed into the bosses, or the like.

In this context, the first hydraulic connector may be formed as one part or as several parts with the collar-like shoulder of the level control piston or of the level control cylinder.

In general, using the integral construction, in particular of the level control piston, a level control system is provided which is simple, of space-saving construction, reliable in use and maintainable in an advantageous manner FIG. 1 shows a front view of an exemplary embodiment of a level control system 10 with a level control cylinder 18 and with a level control piston 16 in the partially retracted state.

The level control system 10 is, according to FIG. 1, provided on a vehicle or a rail vehicle or a car body 12 of a rail vehicle.

The level control piston 16 is arranged within the level control cylinder 18.

The level control piston 16 is, in FIG. 1, situated close to an end position in which the predefined minimum structural height of the level control system 10 is realized.

For example, the level control system is configured with a first fixing disk 24.1, a second fixing disk 24.2 and an interposed multi-layer spring 23.

The multi-layer spring 23 is provided as a ring-shaped multi-layer spring.

The level control system is fastened to the rail vehicle or to the car body 12 of a rail vehicle using the second fixing disk 24.2.

A closure element 14 is furthermore provided.

The closure element 14 projects into the level control piston 16.

The closure element 14 is arranged centrally in the level control system 10, in particular in the level control piston 16.

The head of the closure element 14 is positioned within the ring-shaped multi-layer spring 23.

A space-saving arrangement of the closure element 14 can thus be provided.

The level control cylinder 18 is configured with an open cylinder side 18.2 from which the level control piston 16 can project or slide out. A stroke or a height adjustment of the level control system 10 can thus be achieved.

Furthermore, the level control cylinder 18 has a collar-like shoulder 18.1 along the open cylinder side 18.2.

The collar-like shoulder or circumference 18.1 of the level control cylinder 18 is configured as a shoulder in relation to the cylindrical basic shape of the level control cylinder 18.

Likewise, the level control piston 16 according to FIG. 1 has a collar-like shoulder 16.1 along that end which projects out of the level control cylinder 18.

A bellows 25 is arranged between the collar-like shoulder 18.1 of the level control cylinder 18 and the first fixing disk 24.1 or the collar-like shoulder 16.1 of the level control piston 16.

The bellows 25 is configured between the collar-like shoulders 16.1 and 18.1 such that the level control system 10, in particular the level control cylinder 18 and the level control piston 16, are protected against contamination.

Between the collar-like shoulders 16.1 and 18.1 of the level control piston 16 and of the level control cylinder, spacer elements 28 are arranged symmetrically with respect to one another.

In this context, according to a further exemplary embodiment, provision may be made whereby the spacer elements 28 are arranged symmetrically directly between the collar-like shoulder 18.1 of the level control cylinder 18 and the car body 12 of the rail vehicle.

It is also conceivable that the spacer elements 28 are arranged in a symmetrically distributed manner between the first fixing disk 24.1 or the collar-like shoulder 16.1; 18.1 of the level control piston 16 or of the level control cylinder 18 and the car body 12 (not shown in FIG. 1).

According to a further exemplary embodiment (not shown in FIG. 1), provision may be made whereby the at least one spacer element 28 or the spacer elements 28 are arranged directly between the collar-like shoulder 18.1 of the level control cylinder 18 and a car body 12 of the rail vehicle 10.

In this case, the spacer element or the spacer elements 28 are situated in an intermediate space that connects the collar-like shoulder 18.1 of the level control cylinder 18 and the car body 12 directly to one another.

The spacer elements 28 are optionally arranged in a working region or a working space which is formed by the collar-like shoulders 16.1 and 18.1 of the level control piston 16 and of the level control cylinder 18 and the first fixing disk 24.1.

In particular, in each case three spacer elements 28 stacked on top of one another are provided.

The lowermost spacer element 28 is optionally connectable to the collar-like shoulder 18.1 of the level control cylinder 18, in particular using fixing elements 28.1.

The spacer elements 28 stacked on top of one another are optionally connectable to one another, optionally likewise using fixing elements 28.1.

In this context, fixing elements 28.1 may be screws, rivets, securing pins, magnetic elements or the like.

Expedient fastening and positioning of the spacer elements 28 along the collar-like shoulder 18.1 of the level control cylinder 18 can be provided.

A minimum stroke or minimum spacing between the level control piston 16 and the level control cylinder 18 can be predetermined using the spacer elements 28 between the collar-like shoulders 16.1 and 18.1.

The spacer elements 28 are optionally designed as half-segment disks.

Thus, the spacer elements 28 can be inserted between the collar-like shoulders 16.1 and 18.1 of the level control piston 16 and of the level control cylinder 18 even when the level control system 10 has been assembled and is ready for use.

The spacer elements 28 are in this case fastenable to the collar-like shoulder 16.1; 18.1 of the level control piston 16 or of the level control cylinder 18 or to the first fixing disk 24.1. or is fastenable the car body (12).

Additionally, provision may be made whereby the spacer elements 28 are fastenable to the car body 12.

In this context, it is furthermore conceivable that the spacer elements 28 are alternatively or additionally fastenable to one another and to the corresponding fastening points discussed above in each case using at least one magnetic fastening element.

In this regard, the magnetic fastening element is attached to the fastening points and/or to the spacer element 28.

It is furthermore conceivable that the spacer elements 28 are formed from a magnetic material.

In an advantageous embodiment, a readjustment of the minimum lifting height by adding or removing spacer elements 28 is possible at any time.

According to FIG. 1, the level control piston 16 is partially extended and is situated close to an end position, which characterizes the minimum stroke of the level control system 10 shown.

A minimum stroke of the level control system according to FIG. 1 can be predefined as desired using the spacer elements 28.

A first and a second hydraulic connector 16.2 and 16.3 are furthermore arranged along the collar-like shoulder 16.1 of the level control piston 16.

In particular, the hydraulic connectors 16.2 and 16.3 are provided so as to be integrally formed tangentially on the collar-like shoulder 16.1 of the level control piston 16.

In particular, bosses are provided along the collar-like shoulder 16.1 of the level control piston 16, onto which or in which bosses the first and second hydraulic connectors 16.2 and 16.3 are integrally formed or received.

The bosses may be designed as a cutout or milled-out portion for receiving the first and second hydraulic connectors 16.2 and 16.3.

In FIG. 1, the bosses are provided such that they project beyond the outer diameter of the collar-like shoulder 16.1.

The first and second hydraulic connectors 16.2 and 16.3 can thus be received, inserted and positioned in the bosses.

With respect to the longitudinal axis X of the level control piston 16, the hydraulic connectors 16.2 and 16.3 can be positioned in a tangentially running manner on the collar-like shoulder 16.1, in particular on the circular outer diameter of the collar-like shoulder 16.1, using the first and second bosses.

In relation to the disk-shaped main body of the collar-like shoulder 16.1 and/or the longitudinal axis X of the level control piston 16, the first and second hydraulic connectors 16.2 and 16.3 tangentially adjoin the collar-like shoulder 16.1.

Consequently, external fluid lines can be advantageously connected in terms of flow tangentially to the level control piston 16, in particular to the first and second hydraulic connectors 16.2 and 16.3.

The hydraulic connectors 16.2 and 16.3 may be connected in non-positively and/or positively locking fashion to the bosses of the collar-like shoulder 16.1.

In particular, the hydraulic connectors 16.2 and 16.3 may be welded, adhesively bonded, screwed or clamped to or on the bosses of the collar-like shoulder 16.1, pressed into the bosses, or the like.

The first and second hydraulic connectors 16.2 and 16.3 may be formed as one part or as several parts with the collar-like shoulder 16.1 of the level control piston.

In the context of the disclosed embodiments, the hydraulic connectors 16.2 and 16.3 are always configured and arranged such that external fluid lines can be connected in a tangential form to the level control system 10.

The first hydraulic connector 16.2 may be provided as an inflow or fluid inlet.

The second hydraulic connector 16.3 may be configured as an outflow or fluid outlet or as a drain valve.

In this context, a configuration of the second hydraulic connector 16.3 as a pressure relief valve is also conceivable.

Furthermore, the first and second hydraulic connectors 16.2 and 16.3 can be used in an inverted manner with regard to their function.

It is also conceivable that one of the hydraulic connectors 16.2 and 16.3 is used both as a fluid inlet and a fluid outlet, while the other can be used, for example, as a pressure relief valve.

The configuration of the collar-like shoulder or circumference 16.1, in particular the layer thickness of the shoulder 16.1, is based in particular on the size of the first and second hydraulic connectors 16.2 and 16.3.

Thus, the collar-like shoulder 16.1 may be designed with any desired collar thickness in a manner dependent on the application-specific requirements.

In particular, the configuration of the first and second hydraulic connectors 16.2 and 16.3 is decisive for the provided thickness of the collar-like shoulder 16.1.

In this way, a structural-space-saving configuration of the level control system 10, and in particular of the level control piston 16, can be provided.

Furthermore, the level control system 10 according to FIG. 1 is connected to a running gear 27 via a stop buffer 26.

A spiral spring 22 is arranged between the stop buffer 26 and the level control cylinder 18.

Figure 2:
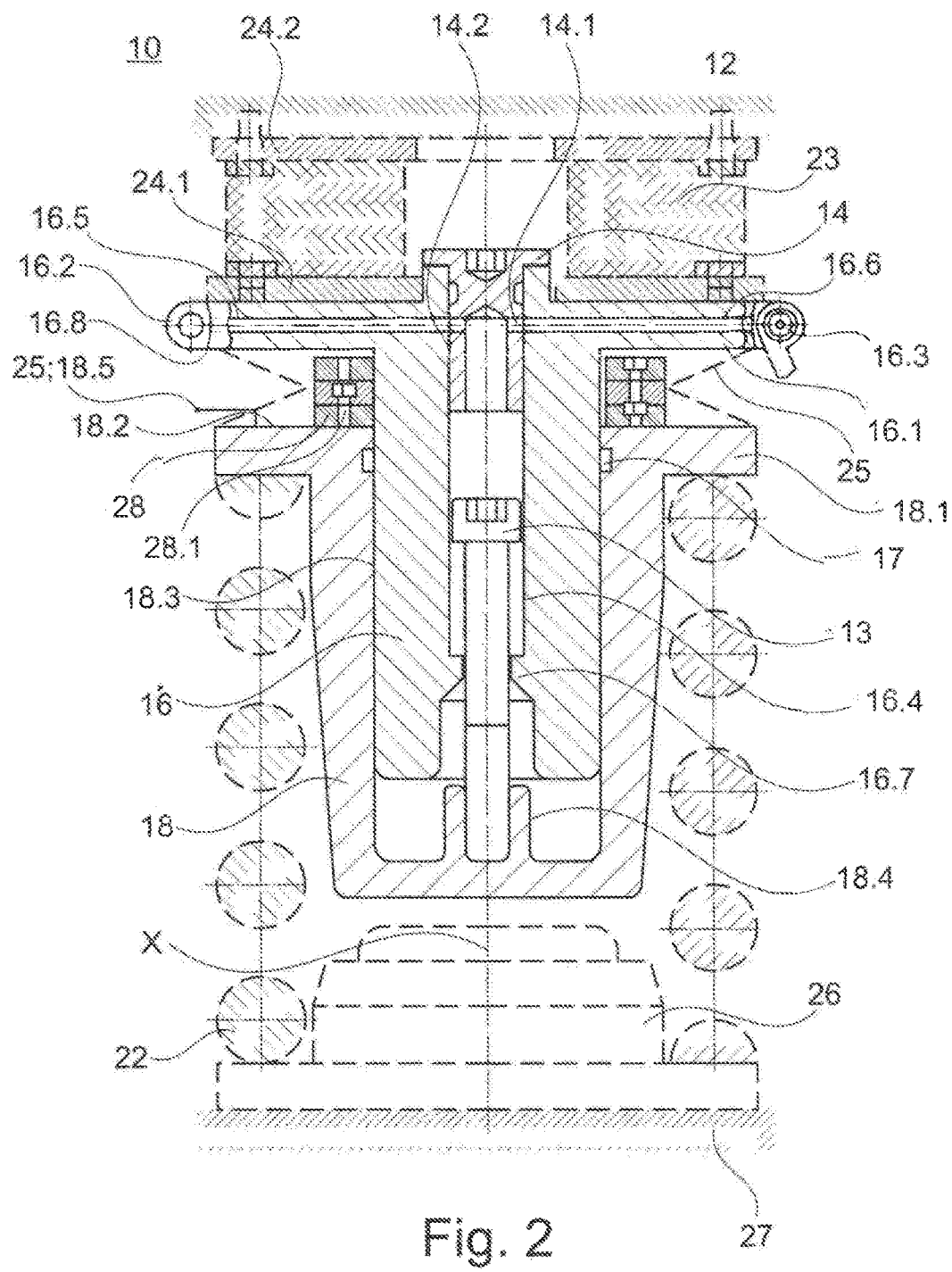
FIG. 2 shows a schematic sectional view of the exemplary embodiment according to FIG. 1.

FIG. 2 shows a sectional view of the exemplary embodiment according to FIG. 1.

Compared to the illustration from FIG. 1, the internal structure of the level control piston 16 and of the level control cylinder 18 is additionally apparent from FIG. 2.

The level control piston 16 is configured with a substantially constant or uniform outer diameter over its entire longitudinal extent, aside from the collar-like shoulder 16.1.

The level control piston 16 is movably received in an inner diameter 18.3 of the level control cylinder 18.

Furthermore, the level control piston 16 and the level control cylinder 18 each have a central bore 16.4 and 18.4, in which a fastening element 13 is received.

The bore 18.4 of the level control cylinder 18 is formed as an elevation along the base of the inner diameter 18.3 of the level control cylinder 18.

In FIG. 2, the fastening element 13 is configured as a screw with a screw head.

The central bore 18.4 of the level control cylinder 18 at least partially has an internal thread for the screw connection of the fastening element 13.

The central bore 16.4 of the level control piston 16 is configured with a varying diameter by virtue of a projection being formed in certain portions along the central bore 16.4.

The projection 16.7 constitutes a stop in particular for a head of the fastening element 13.

A relative movement of the level control piston 16 with respect to the level control cylinder 18 is thus limited using the fastening element 13 and the projection 16.7 and the varying diameter of the central bore 16.4.

In the context of the disclosed embodiments, movable receiving or connection of the level control piston 16 with the level control cylinder 18 can be achieved using the fastening element 13 and the central bores 16.4 and 18.4.

In this context, a maximum stroke of the level control piston 16 is predetermined using the varying diameter of the central bore 16.4 of the level control piston 16 and of the fastening element 13.

Furthermore, only one single, centrally arranged fastening element 13 is provided in order to be able to provide the expedient connection between the level control cylinder 18 and the level control piston 16.

The central bore 16.4 of the level control piston 16 is closed using a closure element 14.

According to FIG. 2, the closure element 14 has an O-ring with a corresponding groove.

The central bore 16.4 or an inner diameter 18.3 of the level control cylinder 18 is thus expediently sealed with respect to the surrounding atmosphere.

Furthermore, a cylinder seal 17 is provided along the inner diameter of the level control cylinder 18.

The cylinder seal 17 is configured as an O-ring.

Alternatively, the cylinder seal 17 may be configured as any desired sealing compound or as a ring-shaped sealing compound with any desired cross section. The seal may also be provided or realized by vulcanization.

According to FIG. 2, the cylinder seal 17 is accommodated in a seal groove along the inner diameter 18.3 of the level control cylinder 18.

The cylinder seal 17 permits sealing of the inner diameter 18.3 of the level control cylinder 18 with respect to the outer diameter of the level control piston 16.

In the context of the present disclosed embodiments, provision may alternatively be made whereby the level control piston 16 has a seal groove in which the cylinder seal 17 is arranged.

In general, the cylinder seal 17 is designed, and arranged along the sliding surfaces of the level control piston 16 or of the level control cylinder 18, in this way.

A seal of the inner diameter 18.3 of the level control cylinder 18 with respect to the outside atmosphere or the atmospheric surroundings can thus be provided.

Using the cylinder seal 17, a hydrostatic pressure which is above or below the air pressure or atmospheric pressure surrounding the level control system 10 can be set as required in the inner diameter 18.3 of the level control cylinder 18.

According to the sectional view shown in FIG. 2, the first and second hydraulic connectors 16.2 and 16.3 are arranged tangentially along the collar-like shoulder 16.1 of the level control cylinder 16.

The first hydraulic connector 16.2 is connected in terms of flow via a first fluid channel 16.5 and the central bore 16.4 of the level control piston 16 to the inner diameter 18.3 of the level control cylinder 18.

The second hydraulic connector 16.3 is connected in terms of flow via a second fluid channel 16.6 and the central bore 16.4 of the level control piston 16 to the inner diameter 18.3 of the level control cylinder 18.

The first and a second fluid channel 16.5 and 16.6 are configured integrally with the level control piston 16.

In particular, the first and second fluid channels 16.5 and 16.6 are integrated in the collar-like shoulder 16.1 of the level control piston 16.

The first and second fluid channels 16.5 and 16.6 according to FIG. 2 thus extend from the hydraulic connectors 16.2 and 16.3 along the collar-like shoulder 16.1 in a horizontal direction or orthogonally with respect to the longitudinal axis X of the level control piston 16.

According to FIG. 2, the closure element 14 projects beyond the fluid channels 16.5 and 16.6 into the central bore 16.4 of the level control piston 16.

In order to provide a connection in terms of flow of the fluid channels 16.5 and 16.6 into the central bore 16.4, the closure element 14 has a passage bore 14.1, which is oriented in alignment with respect to the fluid channels 16.5 and 16.6.

Alternatively, the closure element 14 may for example be provided with an additional circumferential groove 14.2, such that a connection in terms of flow between the fluid channels 16.5 and 16.6 and the central bore 16.4 of the level control piston 16 can be provided.

In this way, an alignment of the passage bore 14.1 with respect to the fluid channels 16.5, 16.6 is not necessary.

By virtue of in particular the hydraulic connectors 16.2 and 16.3, the fluid channels 16.5 and 16.6 and the central bore 16.4 with the projection 16.7 as stroke stop being configured in the level control piston 16, an integral construction of the level control piston 16 is realized.

Accordingly, the level control cylinder 18 can be of relatively simple configuration, in particular with an at least substantially constant inner diameter 18.3.

Furthermore, the arrangement of the hydraulic connectors 16.2 and 16.3 on the level control piston 16 permits the space-saving tangential coupling of external fluid lines.

Figure 3:
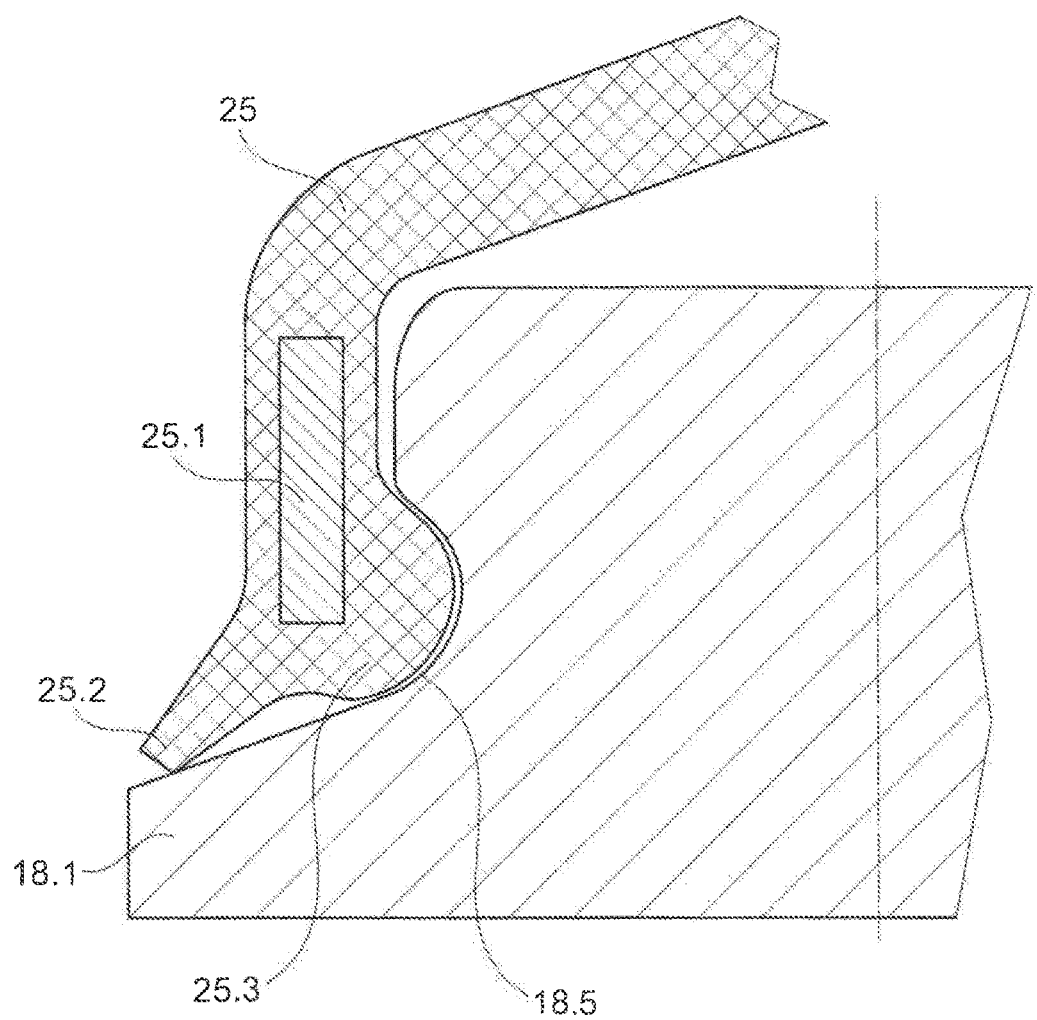
FIG. 3 shows a schematic detail view of the exemplary embodiment according to FIG. 1, with a bellows fastened to the level control cylinder.

FIG. 3 shows a detail view of the exemplary embodiment according to FIG. 1 with a bellows 25 fastened to the level control cylinder 18.

The bellows 25 has a stiffening element 25.1 which is of ring-shaped configuration and which has a rectangular cross section.

The stiffening element 25.1 is entirely integrated into the wall of the bellows 25.

Using the stiffening element 25.1, the bellows 25 has a side wall termination which is suitable for expedient engagement into an encircling receiving groove 18.5 of the collar-like shoulder 18.1 of the level control cylinder 18.

Furthermore, the collar-like shoulder 16.1 of the level control piston 16 has a receiving groove 16.8 for receiving the bellows 25.

In this way, a further side wall termination of the bellows is likewise suitable for expedient engagement into the encircling receiving groove 16.8 of the collar-like shoulder 16.1 of the level control piston 16.

Using the stiffening element 25.1, expedient local stiffening of the bellows can be provided.

Furthermore, the stiffening element 25.1 has a shaping effect on the bellows 25, in particular along the side wall termination for engagement into the receiving groove 18.5.

The bellows 25 can engage securely and detachably into the receiving groove 18.5 of the level control cylinder 18.

Provision may furthermore be made whereby the bellows 25 can engage securely and detachably into the receiving groove 16.8 of the level control piston 16.

In this way, using the stiffening element 25.1, an integrated stiffening function for stabilizing the bellows 25 and an integrally configured securing function are provided.

In particular, the bellows 25 may be formed, in the region of the stiffening element 25.1, with a bead 25.3 which is suitable for engagement into the receiving groove 16.8, 18.5 of the level control cylinder 18 and of the level control piston 16.

The bead 25.3 is designed such that a possible rotation of the cylinder does not lead to twisting of the bellows 25.

Furthermore, the bellows has a sealing lip 25.2 which projects outward in the circumferential direction.

The sealing lip 25.2 is intended to prevent dirt between the bead 25.3 and the receiving groove 16.8, 18.5 from impeding the rotational smooth movement of the collar-like shoulder 18.2 of the level control cylinder 18 or bellows 25.

Using the sealing lip 25.2, contamination or some other ingress of foreign bodies under the bellows 25, into the region of the spacer elements 28 and of the sliding surface between level control piston 16 and level control cylinder 16, is also prevented.

In summary, the disclosed embodiments constitute an integral construction in order to realize a space-saving configuration and also functional characteristics of the system in a simple manner In general, the arrangement of at least one spacer element 28 permits reliable spacing between level control cylinder 18 and level control piston 16, in particular in the event of a fault, and is optionally adjustable when the level control system has been assembled and is ready for use.

Furthermore, the centrally arranged fastening element 13 permits a simple, secure and expedient connection of the level control piston 16 to the level control cylinder 18.

Furthermore, the arrangement and fastening of a bellows 25 can be achieved in a simple and inexpensive manner using an integral construction of the level control cylinder 18 and of the bellows 25.

Finally, the disclosed embodiments are able to provide an integral construction of a level control system, such that significant advantages can be achieved both in installation, servicing and during operation.

REFERENCE DESIGNATIONS

10 Level control system
12 Car body (of a rail vehicle)
13 Fastening element
14 Closure element
14.1 Passage bore
14.2 Circumferential groove
16 Level control piston
16.1 Collar-like shoulder
16.2 First hydraulic connector
16.3 Second hydraulic connector
16.4 Central bore
16.5 First fluid channel
16.6 Second fluid channel
16.7 Projection
16.8 Receiving groove
17 Cylinder seal
18 Level control cylinder
18.1 Collar-like shoulder
18.2 Open cylinder side
18.3 Inner diameter
18.4 Central bore
18.5 Receiving groove
22 Spiral spring
23 Multi-layer spring
24.1 First fixing disk
24.2 Second fixing disk
25 Bellows
25.1 Stiffening element
25.2 Sealing lip
25.3 Bead
26 Stop buffer
27 Running gear
28 Spacer element
28.1 Fixing element
X Longitudinal axis (of the level control cylinder and of the level control piston)

The invention claimed is:

1. A level control system for adjusting the level of a rail vehicle, the system comprising:
at least one level control cylinder; and
one level control piston,
wherein the level control piston is at least partially movably received in the level control cylinder,
wherein the level control cylinder has a collared shoulder,
wherein the level control system has a first fixing disk which is connected to the level control piston for the purposes of transmitting a lifting movement, wherein the first fixing disk is coupled to a second fixing disk via an interconnecting spring,
wherein at least one spacer element is arranged between the collared shoulder the level control cylinder and the first fixing disk,
wherein the at least one spacer element is arranged between the collared shoulder of the level control cylinder and a car body of the rail vehicle,
wherein the at least one spacer element is a half-segment disk,
wherein the at least one spacer element is included in at least two spacer elements,
wherein the level control system has at least one bellows which is arranged between the collared shoulder of the level control cylinder and the first fixing disk and/or the collared shoulder of the level control piston, wherein the collared shoulder of the level control cylinder and/or the collared shoulder of the level control piston has a receiving groove for receiving the at least one bellows, wherein the at least one bellows has a metal ring and a bead configured such that the bellows is detachably and rotatably fixed in the receiving groove of the level control cylinder and/or of the level control piston.

2. The level control system of claim 1, wherein the level control piston has a collared shoulder in contact with the first fixing disk, such that the at least one spacer element is arranged between the collared shoulders of the level control piston and of the level control cylinder.

3. The level control system of claim 1, wherein the at least one spacer element is fastenable to the collared shoulder of the level control piston or of the level control cylinder, to the first fixing disk or to the car body.

4. The level control system of claim 1, wherein the at least one spacer element is fastenable by at least one magnetic fastening element or is formed from a magnetic material.

5. The level control system of claim 1, wherein the at least two spacer elements are arranged in a symmetrically distributed manner between the collared shoulder of the level control cylinder and the first fixing disk.

6. The level control system of claim 1, wherein the at least two spacer elements are arranged symmetrically directly between the collared shoulder of the level control cylinder and the car body of the particular rail vehicle.

7. The level control system of claim 1, wherein the level control system has a single, in particular centrally arranged fastening element for the purposes of connecting the level control piston to the level control cylinder.

* * * * *